(12) United States Patent
Brewster

(10) Patent No.: US 11,747,111 B2
(45) Date of Patent: Sep. 5, 2023

(54) REFLEX SIGHTING OPTICS WITH USER CHANGEABLE LENS

(71) Applicant: Michael Shawn Brewster, Lutz, FL (US)

(72) Inventor: Michael Shawn Brewster, Lutz, FL (US)

(73) Assignee: Defense Firearms, LLC, Lutz, FL (US)

( * ) Notice: Subject to any disclaimer, the term of this patent is extended or adjusted under 35 U.S.C. 154(b) by 0 days.

(21) Appl. No.: 17/645,855

(22) Filed: Dec. 23, 2021

(65) Prior Publication Data

US 2022/0397372 A1    Dec. 15, 2022

Related U.S. Application Data

(60) Provisional application No. 63/202,416, filed on Jun. 10, 2021.

(51) Int. Cl.
| | |
|---|---|
| *F41G 1/30* | (2006.01) |
| *G02B 7/14* | (2021.01) |
| *F41G 1/54* | (2006.01) |
| *G02B 27/36* | (2006.01) |
| *F41G 1/17* | (2006.01) |
| *G02B 23/10* | (2006.01) |

(52) U.S. Cl.
CPC ............. *F41G 1/30* (2013.01); *F41G 1/17* (2013.01); *F41G 1/545* (2013.01); *G02B 7/14* (2013.01); *G02B 23/10* (2013.01); *G02B 27/36* (2013.01)

(58) Field of Classification Search
CPC ........................................................ F41G 1/30
See application file for complete search history.

(56) References Cited

U.S. PATENT DOCUMENTS

| | | |
|---|---|---|
| 3,145,248 A | 8/1964 | Shuping |
| 3,908,282 A | 9/1975 | Steffan |
| 4,856,879 A | 8/1989 | Gehmann |
| 6,123,006 A | 9/2000 | Bedford, Jr. et al. |
| 6,327,806 B1 * | 12/2001 | Paige ............... F41G 1/30 42/130 |
| 6,811,268 B2 | 11/2004 | Watson |
| 7,634,866 B2 | 12/2009 | Javorsky |
| 8,925,238 B2 | 1/2015 | Anderson |
| 9,958,234 B2 | 5/2018 | Campean |
| 10,731,947 B2 * | 8/2020 | Grace ............... F41G 1/14 |
| 10,754,240 B2 | 8/2020 | Peel et al. |
| 10,982,931 B2 | 4/2021 | Baker et al. |
| 11,047,646 B2 | 6/2021 | Libotte |
| 2007/0236790 A1 | 10/2007 | Turienzo et al. |

(Continued)

*Primary Examiner* — Reginald S Tillman, Jr.
(74) *Attorney, Agent, or Firm* — Squire Patent Consulting & IP Law LLC; Brendan E. Squire

(57) ABSTRACT

A firearm sighting optic that can have the lenses easily and quickly replaced by the user is disclosed. This sighting optics allows the lens to be inserted from the bottom of a red dot sighting unit and then be secured by set screws. The firearm sighting optic includes a base and a hood. The lens is removably retained with the firearm sighting optic by user removable fasteners securing the hood to the base. The lens is housed in a hood that makes sliding the replacement lens into the unit much easier. The hood and base include an interconnecting protrusion and recess for reliable alignment of the lens within the hood and the base.

18 Claims, 3 Drawing Sheets

(56) References Cited

U.S. PATENT DOCUMENTS

2014/0109456 A1\* 4/2014 Jung .................... F41G 1/30
  42/113
2014/0152981 A1 6/2014 Lim et al.
2019/0186869 A1 6/2019 Jen
2020/0049455 A1 2/2020 Hamilton et al.

\* cited by examiner

REFLEX SIGHTING OPTICS WITH USER CHANGEABLE LENS

CROSS-REFERENCE TO RELATED APPLICATION

This application claims the benefit of priority of U.S. provisional application No. 63/202,416 number filed Jun. 10, 2021, the contents of which are herein incorporated by reference.

BACKGROUND OF THE INVENTION

The present invention relates to sights for firearms, more particularly to optical sights for firearms.

Firearm sighting optics usually contain glass or plastic lenses with a variety of coatings. Different lighting environments can substantially degrade the ability to see a red dot reticle that reflects on these lenses. Additionally, when lenses scratch and crack, both problems are compounded because it is not easy to change or swap out lenses in firearm red dot emitting optics.

In other systems, lenses are glued and/or housed in a static frame that makes changing a lens too expensive and time consuming, because the lens must be fixed/changed professionally or disposed of entirely.

As can be seen, there is a need for improved optical sights for firearms.

SUMMARY OF THE INVENTION

In one aspect of the present invention, a reflex sighting optic for a firearm, is disclosed. The reflex sighting optic includes a base having a proximal end, a distal end, and a bottom surface that is adapted to be coupled with a slide or other sight mount location of the firearm. A hood is removably interconnected with the distal end of the base. A lens is removably retained by cooperative engagement of the hood with the base. An LED emitter is disposed at the proximal end of the base. The LED emitter is configured to provide a reticle projection on an inner surface of the lens.

In some embodiments, a plurality of mounting holes are disposed in the bottom surface of the base for attachment of the reflex sighting optic to the firearm.

In some embodiments, a left sidewall and a right sidewall extend between the proximal end and the distal end. A lens shelf is disposed at the distal end and spans between the left sidewall and the right sidewall.

In some embodiment, a groove is defined in a top surface of the lens shelf dimensioned to receive a bottom edge of the lens.

In some embodiment, the left sidewall and the right sidewall rise from the proximal end to the distal end such that the distal end of the left sidewall and the right sidewall are elevated from the lens shelf.

In some embodiments, the hood has an arch shape to span between the left sidewall and the right sidewall.

In some embodiments, the groove is disposed along an interior surface of the hood and is dimensioned to receive a side edge and a top edge of the lens.

In some embodiments, the groove in each of the lens shelf and the hood are aligned to removably retain the lens in a fixed position on the reflex sighting optic.

In some embodiments, a protrusion is defined at a lower end of the hood. A recess is defined in opposed sides of the lens shelf. The protrusion is engageable with the recess to align the hood with the base and retain the lens in alignment within the reflex sighting optic when the lens is replaced by a user.

In other embodiments, an optics shelf is disposed at the proximal end of the base, the optics shelf retaining the LED emitter.

In yet other embodiments, a battery compartment is defined within the base.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide an apparatus and method that allows the user of a red dot emitting firearm optic to exchange a broken, scratched, or different coated lens easily and quickly.

Firearm sighting optics usually contain glass or plastic lenses with a variety of coatings. Different lighting environments can substantially degrade the ability to see a red dot reticle that reflects on these lenses. Additionally, lenses scratch and crack both problems are compounded because it is not easy to change or swap out lenses in firearm red dot emitting optics. The invention claimed here solves this problem.

Figure 1:
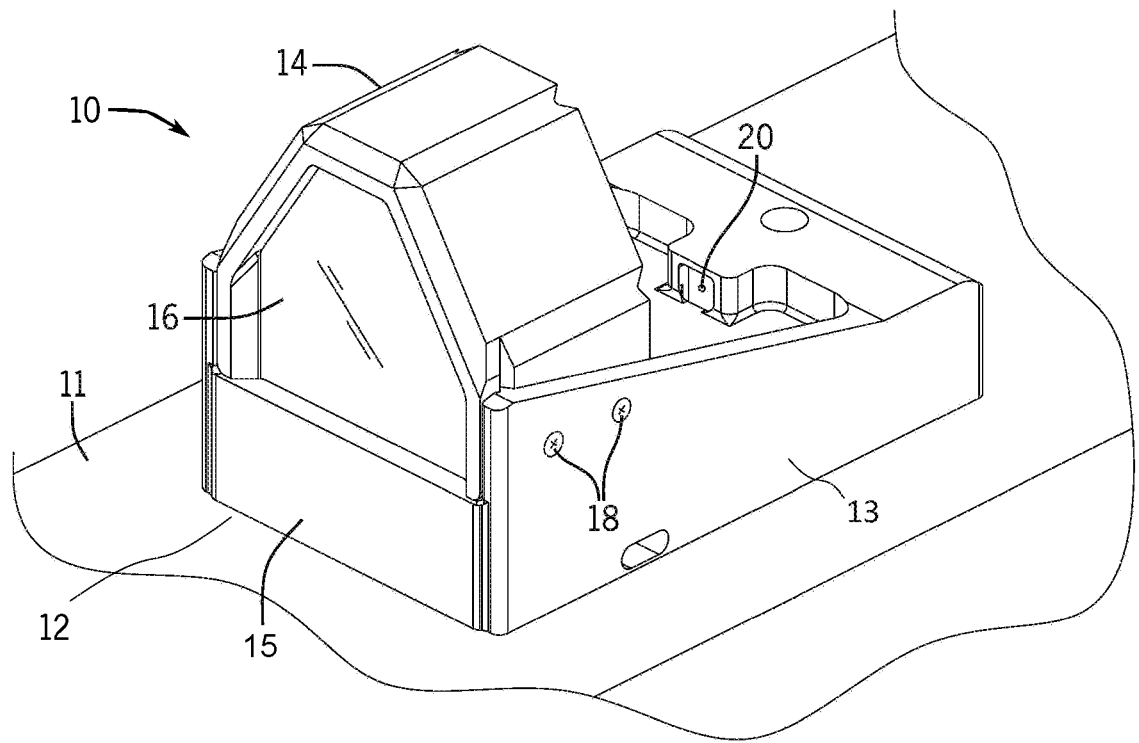
FIG. 1 is a front perspective view of the reflex sighting optic with user changeable lens.
Figure 2:
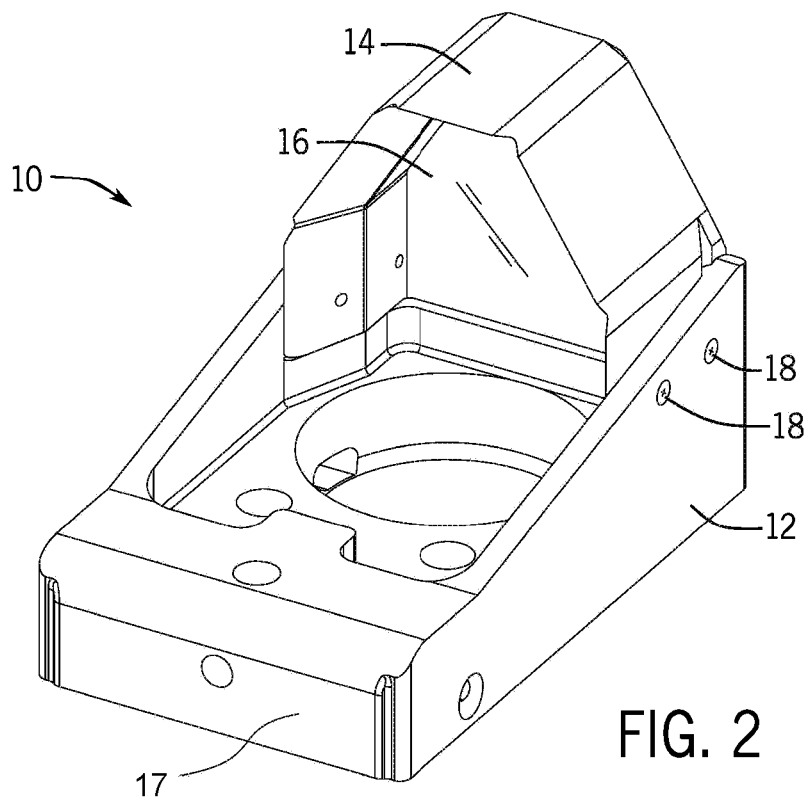
FIG. 2 is rear perspective view of the reflex sighting optic with user changeable lens.
Figure 3:
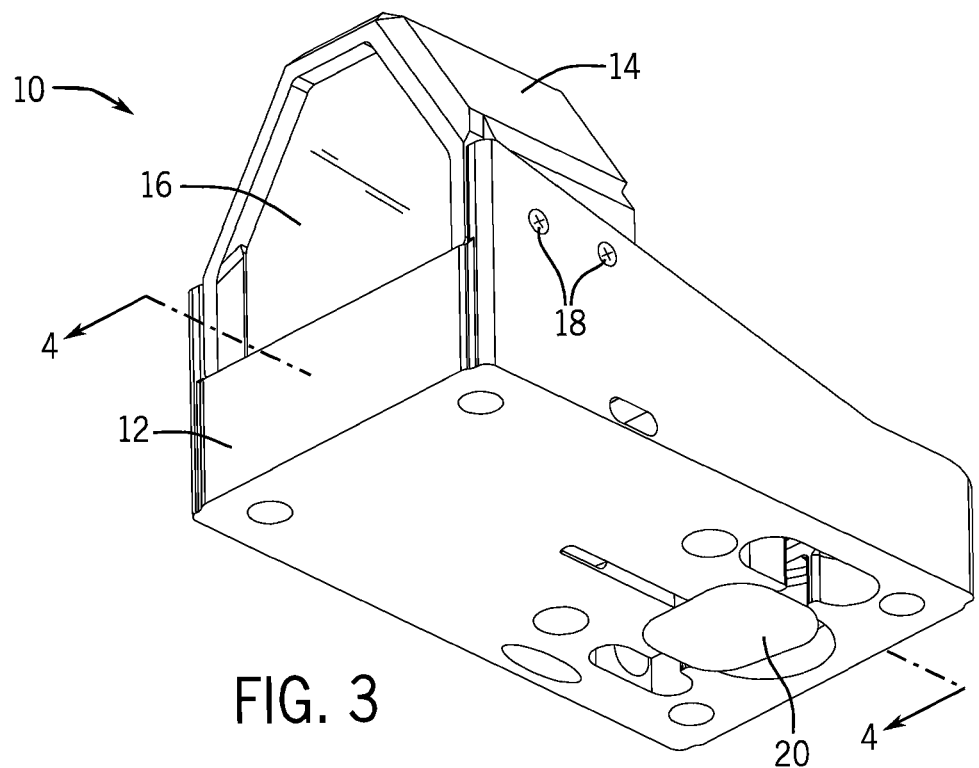
FIG. 3 is a bottom perspective view of the reflex sighting optic with user changeable lens.
Figure 4:
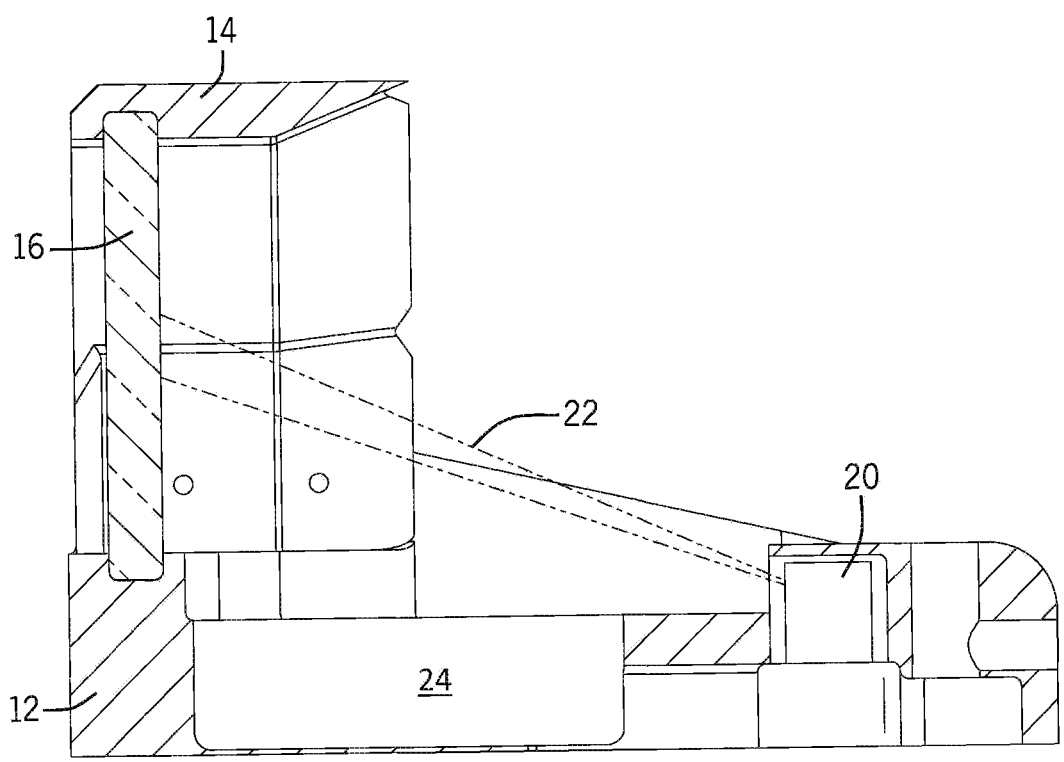
FIG. 4 is a cross-sectional view of the reflex sighting optic with user changeable lens taken on line 4-4 of FIG. 3.
Figure 5:
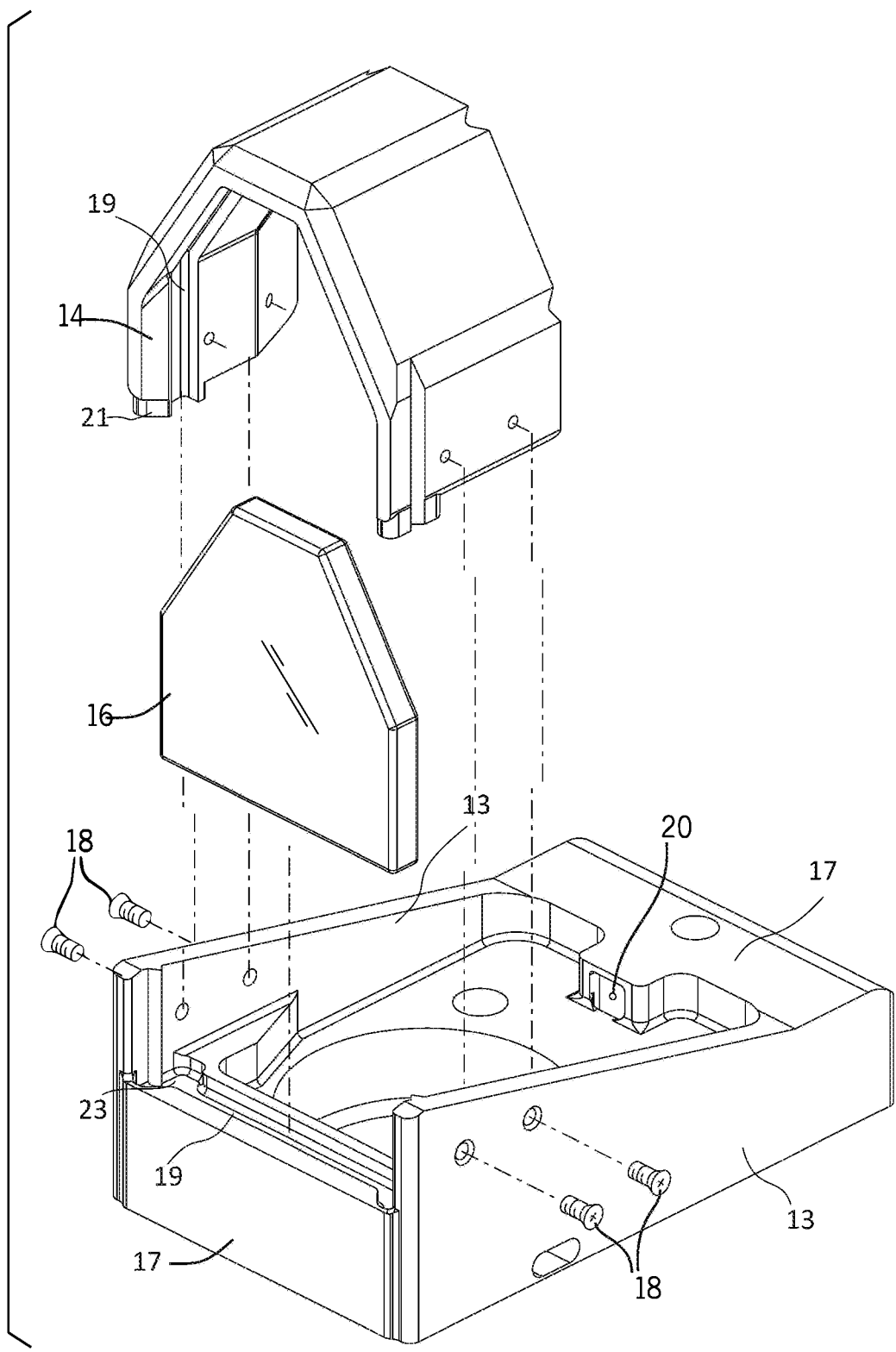
FIG. 5 is an exploded perspective view of the reflex sighting optic with user changeable lens.

As seen in reference to the drawings of FIGS. 1-5, the reflex sighting optic 10 is mounted to a firearm 11. The reflex sighting optic 10 includes a base 12 that is adapted to be coupled with a slide or other sight mount location of the firearm 11. A hood 14 is removably interconnected with the base 12 to retain a lens 16 within the reflex sighting optic 10. An LED emitter 20 is provided at a proximal end of the base 12. The LED emitter 20 is configured to provide a reticle projection 22 on an inner surface of the lens 16.

The base 12 includes a proximal end and a distal end. A plurality of mounting holes in a bottom surface of the base 12 are provided for attachment of the reflex sighting optic 10 to the firearm 11 via a fastener, such as a screw. The base 12 includes a left sidewall 13 and a right sidewall 13 extending between the proximal end and the distal end. A lens shelf 15 is provided at the distal end and spans between the left sidewall 13 and the right sidewall 13. A groove 19 is defined in a top surface of the lens shelf 15 and is dimensioned to receive a bottom end of the lens 16.

The left sidewall 13 and the right sidewall 13 rise from the proximal end to the distal end such that the distal end of the left sidewall 13 and the right sidewall 13 are elevated from the lens shelf 15. The hood 14 has an arch shape to span between the left sidewall 13 and the right sidewall 13. A groove 19 is also disposed along an interior surface of the hood 14. The groove 19 is dimensioned to receive side and top edges of the lens 16. The groove 19 in each of the lens shelf 15 and the hood 14 are aligned to removably retain the lens in a fixed position on the reflex sighting optic 10.

The hood 14 is retained with the elevated portion of the left sidewall 13 and the right sidewall 13 via fasteners 18, such as screws. The fasteners 18 are removable by the user by simple hand tools, such as a screwdriver. A protrusion 21 at a lower distal end of the hood 14 is engageable with a recess 23 defined in opposed sides of the lens shelf 15 to align the hood 14 with the base 12 and retain the lens 16 for reliable alignment within the reflex sighting optic 10 when the lens 16 is replaced by the user.

An optics shelf 17 is disposed at the proximal end of the base 12 for retaining the LED emitter 20. The LED emitter 20 may be powered by a battery (not shown) contained within a battery compartment 24 within the base 12. As indicated previously, the LED emitter 20 is configured to provide a reticle projection 22 on an inner surface of the lens 16.

In use, the user may remove the fasteners 18 securing the hood 14 to the base. The user may then separate the hood 14 from the base 12 to release the lens 16 from the reflex sighting optic 10. The user may then replace the lens 16 by inserting the bottom edge of the lens in the groove 19 defined in the lens shelf 15. The hood 14 is positioned so that the side edges of the lens 16 are received in the groove 19 defined on the inner surface of the hood 14. The hood 14 is then positioned in abutment with the base 12

Typical firearm red dot optics have static lenses and must be replaced by a manufacturer or professional or otherwise disposed of as being unserviceable or unrepairable. This invention allows the user/owner of the optic to easily change out broken lenses or change to a different lens by themself.

Other red dot optics in the firearms field are not user friendly when it comes to changing or fixing lenses on red dot firearm optics. In an austere environment such as military use, it would be advantageous to provide a reflex sighting optics 10 with a user serviceable lens 16, that permits the user to replace the lens 16 with ease and simple hand tools.

It should be understood, of course, that the foregoing relates to exemplary embodiments of the invention and that modifications may be made without departing from the spirit and scope of the invention as set forth in the following claims.

What is claimed is:

1. A reflex sighting optic for a firearm, comprising:
   a base having a proximal end, a distal end, a left sidewall and a right sidewall, and a bottom surface that is adapted to be coupled with a slide or other sight mount location of the firearm;
   a lens shelf disposed at the distal end spans between the left sidewall and the right sidewall, and a recess defined in opposed sides of the lens shelf;
   a hood spans between the left sidewall and the right sidewall, and has a protrusion defined at opposed ends of the hood that is removably interconnected with the recess at the distal end of the base;
   a lens removably retained by cooperative engagement of the hood with the base; and
   an LED emitter disposed at the proximal end of the base, the LED emitter configured to provide a reticle projection on an inner surface of the lens.

2. The reflex sighting optic of claim 1, further comprising:
   a plurality of mounting holes disposed in the bottom surface of the base for attachment of the reflex sighting optic to the firearm.

3. The reflex sighting optic of claim 2, wherein the left sidewall and the right sidewall extending between the proximal end and the distal end.

4. The reflex sighting optic of claim 1, further comprising:
   a first groove defined in a top surface of the lens shelf dimensioned to receive a bottom edge of the lens.

5. The reflex sighting optic of claim 4, wherein the left sidewall and the right sidewall rise from the proximal end to the distal end such that the distal end of the left sidewall and the right sidewall are elevated from the lens shelf.

6. The reflex sighting optic of claim 5, wherein the hood has an arch shape to span between the left sidewall and the right sidewall.

7. The reflex sighting optic of claim 6, a second groove is disposed along an interior surface of the hood, the second groove dimensioned to receive a side edge and a top edge of the lens.

8. The reflex sighting optic of claim 7, wherein the first groove in the lens shelf and second groove of the hood are aligned to removably retain the lens in a fixed position in the reflex sighting optic.

9. The reflex sighting optic of claim 8,
   wherein the protrusion is engageable with the recess to align the hood with the base and retain the lens in alignment within the reflex sighting optic when the lens is replaced by a user.

10. The reflex sighting optic of claim 1, further comprising:
    an optics shelf disposed at the proximal end of the base, the optics shelf retaining the LED emitter.

11. The reflex sighting optic of claim 10, further comprising:
    a battery compartment defined within the base.

12. A sighting optic fora firearm, comprising:
    a base having a proximal end, a distal end, a left side, a right side, and a bottom surface adapted to be coupled with the firearm;
    a lens shelf disposed at the distal end of the base spans between the left side and the right side,
    a recess defined in opposed sides of the lens shelf;
    a hood dimensioned to span between the left side and the right side has a protrusion defined at opposed ends of the hood; and
    a groove defined in each of the lens shelf and the hood is dimensioned to receive a lens removably retained by cooperative engagement of the protrusion of the hood with the recess of the lens shelf.

13. The sighting optic of claim 12, further comprising: the lens.

14. The sighting optic of claim 13, further comprising:
    an LED emitter disposed at the proximal end of the base, the LED emitter configured to provide a reticle projection on an inner surface of the lens.

15. The sighting optic of claim 13, further comprising:
    a plurality of mounting holes disposed in the bottom surface of the base for attachment of the sighting optic to the firearm.

16. The sighting optic of claim 13, wherein the left side and the right side comprise a left sidewall and a right sidewall extending between the proximal end and the distal end.

17. The sighting optic of claim 4, wherein the left sidewall and the right sidewall rise from the proximal end to the distal end such that the distal end of the left sidewall and the right sidewall are elevated from the lens shelf.

18. The sighting optic of claim 13, the groove further comprising:
   a first groove defined in a top surface of the lens shelf dimensioned to receive a bottom edge of the lens; and
   a second groove defined in an inner surface of the hood dimensioned to receive a side and a top edge of the lens.

\* \* \* \* \*